United States Patent
Collins

[11] 3,914,800
[45] Oct. 28, 1975

[54] FLUID MECHANICAL TACTILE OSCILLOSCOPE TO AUGMENT THE FIVE SENSES

[75] Inventor: Carter C. Collins, Mill Valley, Calif.

[73] Assignee: The Institutes of Medical Sciences, San Francisco, Calif.

[22] Filed: June 6, 1974

[21] Appl. No.: 476,978

[52] U.S. Cl. .............................. 3/1; 3/1.2; 340/407; 178/DIG. 32
[51] Int. Cl.² ...................... A61F 1/00; A61N 1/36
[58] Field of Search ...................................... 3/1–1.2; 128/64, 66; 35/35 A; 340/407; 178/DIG. 32

[56] References Cited
UNITED STATES PATENTS

| | | | |
|---|---|---|---|
| 3,562,408 | 2/1971 | Collins et al. | 35/35 A |
| 3,628,193 | 12/1971 | Collins | 3/1 |

FOREIGN PATENTS OR APPLICATIONS

| | | | |
|---|---|---|---|
| 457,964 | 7/1913 | France | 128/64 |

Primary Examiner—Ronald L. Frinks
Attorney, Agent, or Firm—Townsend and Townsend

[57] ABSTRACT

A tactile imaging interface to the human body is disclosed for operation in combination with an input transducer (typically a solid-state image sensor), and suitable conversion electronics. A fluid jet, preferably discharging water, is deflected by electro-mechanical motors (typically a galvanometer) such as is used to drive pen motors and modulated in discharge pressure to impinge its resultant discharge jet on a thin flexible membrane in contact with a mechanically sensitive skin area. The conversion electronics drive the galvanometer motor controls for deflection and modulate the jet discharge in response to the input transducer which is typically an image sensor receiving an image. By the expedient of providing the transducer (or image sensor) and jet with either a conventional raster scan or a preferred cursive scan, or cursively tracing a stored, raster scanned image (by a cursive tracing algorithm in an analog or digital computer), or slowly tracing fast oscilloscope wave forms onto the skin by the use of a conventional sampling amplifier, transduced information supplementing or replacing a sensory modality (typically lost vision) is transmitted to the human tactile nervous system through the membrane.

16 Claims, 4 Drawing Figures

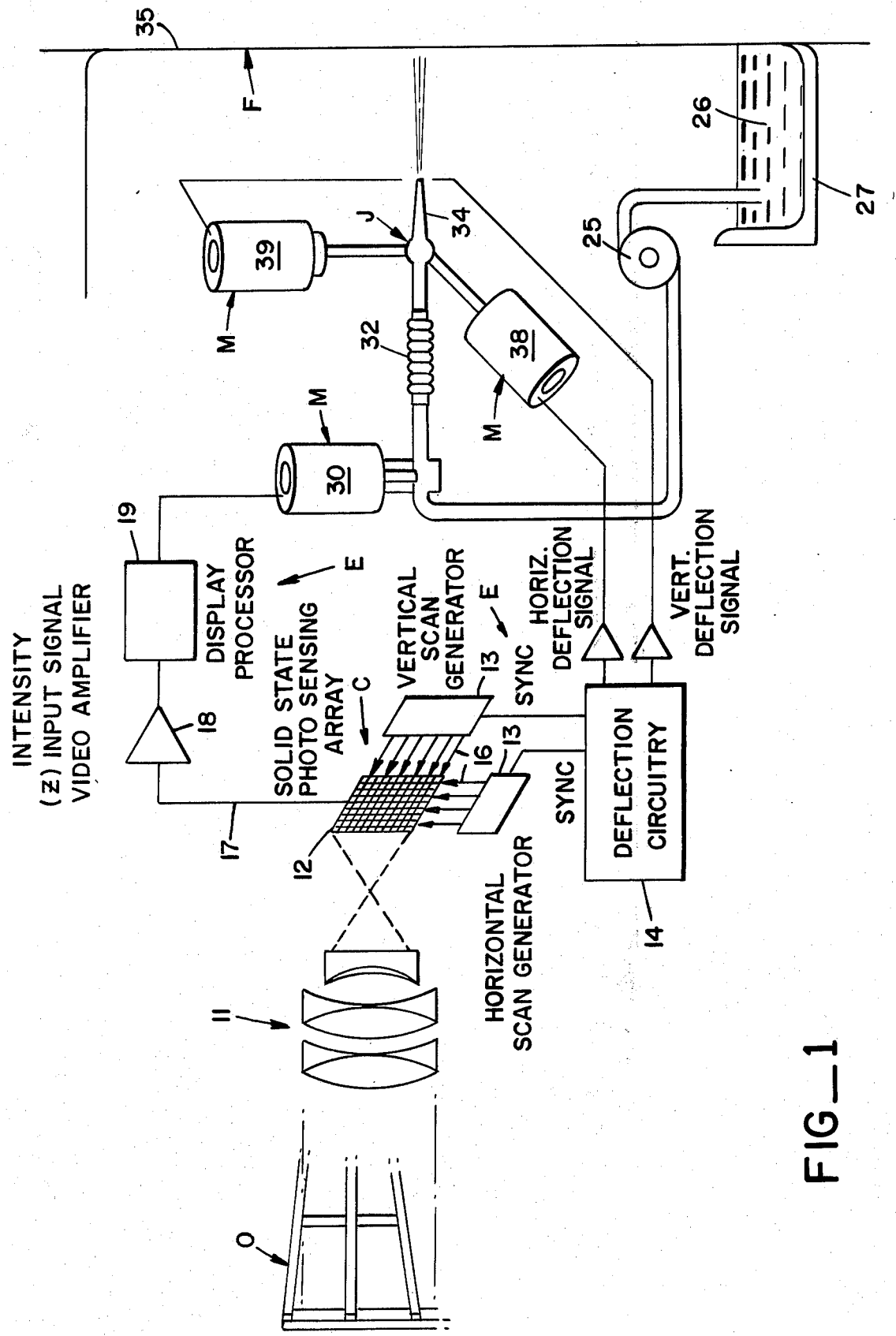
FIG_1

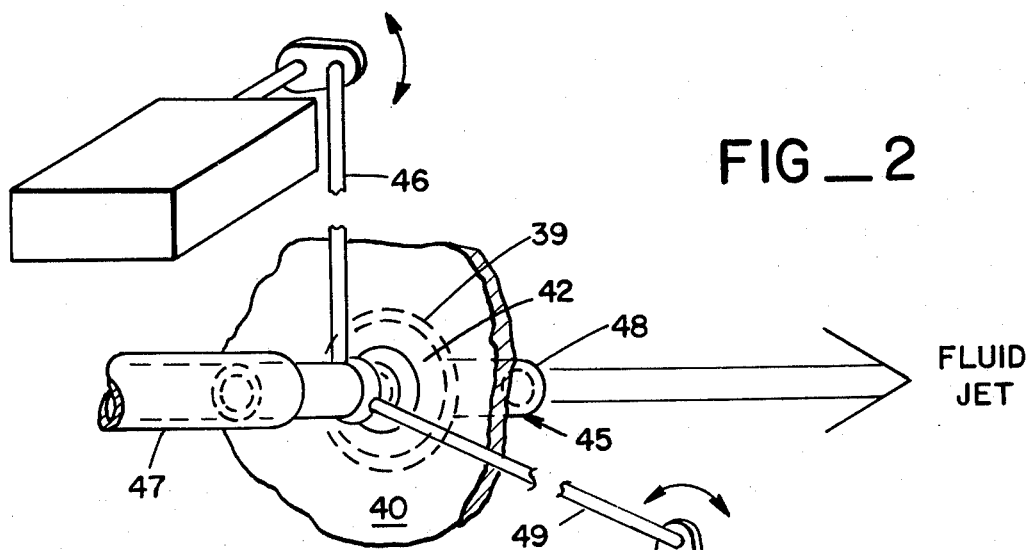
FIG_2
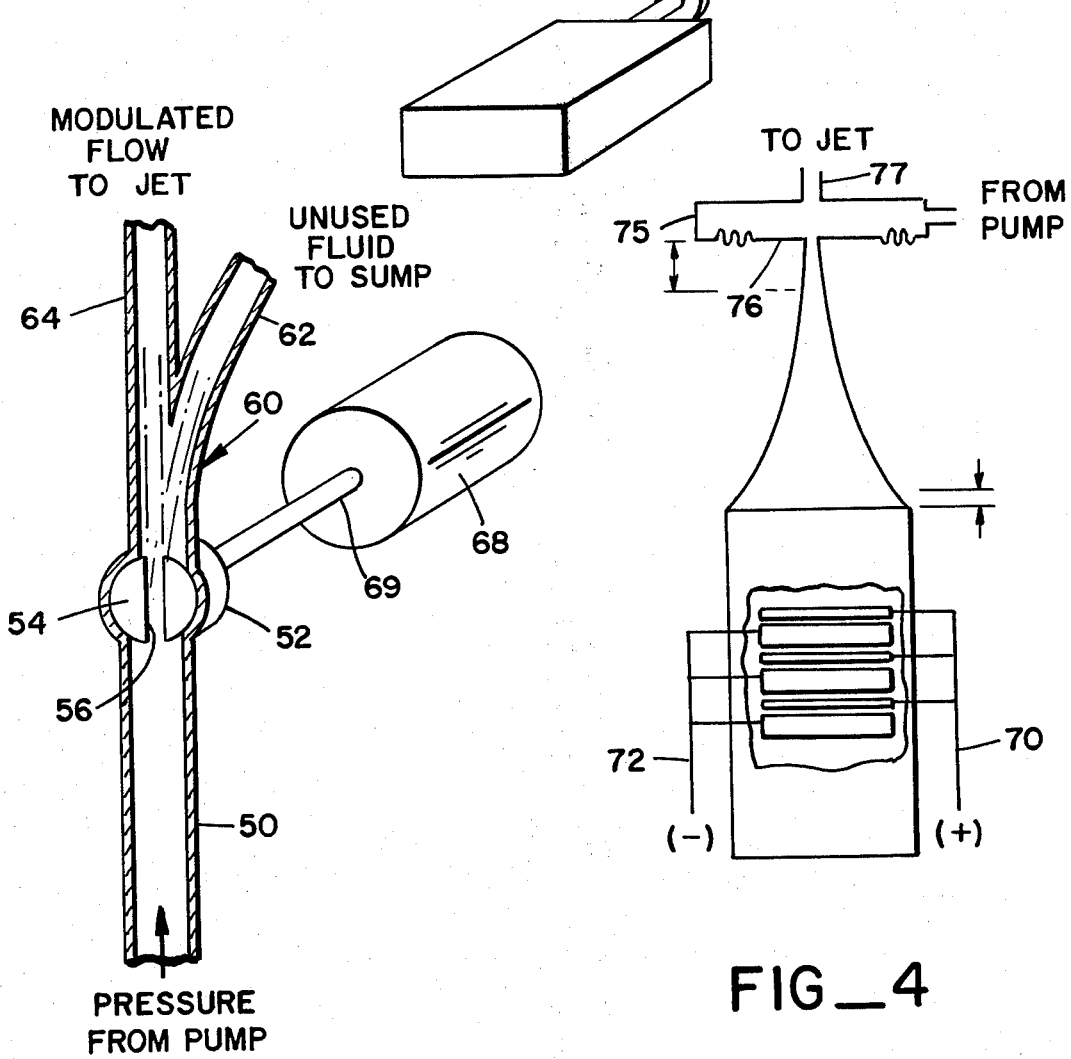
FIG_3
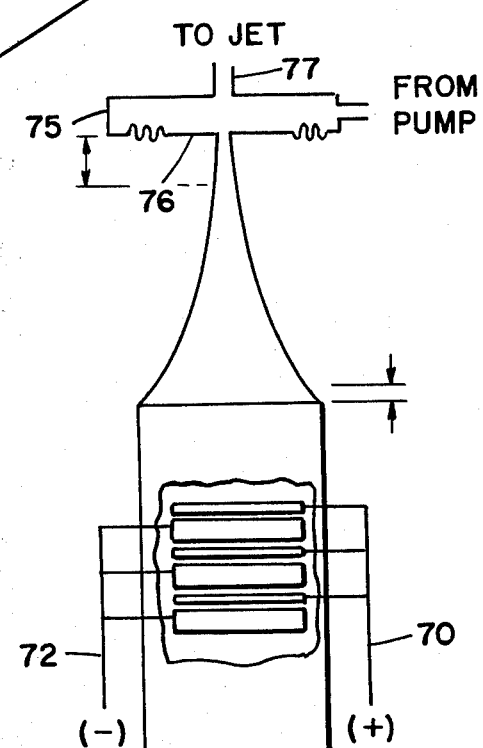
FIG_4

FLUID MECHANICAL TACTILE OSCILLOSCOPE TO AUGMENT THE FIVE SENSES

The invention described herein was made in the course of work under a grant or award from the Department of Health, Education and Welfare.

This invention relates to an apparatus which, in contact with the skin, is capable of imparting tactile nervous system input to supplement or replace a lost sensory modality, such as the visual system. Specifically, an improved apparatus and process for imparting tactile sensory inputs to the skin, typically of images, is disclosed.

SUMMARY OF THE PRIOR ART

The necessary elements to supplement a sensory modality or to replace a lost sensory modality are an input transducer capable of detecting physical energy modulated by information characteristic of the sensory mode, suitable conversion electronics, and a tactile stimulator which can communicate the information from the transducer to the tactile nervous system. The device output constitutes input stimulus energy to the tactile nervous system. This energy must be of a form to which skin receptors can respond. Heretofore, mechanical and electrical stimulation has been most successfully used for this purpose.

Emulating an image by vibrating mechanical tips to the skin is known. See U.S. Pat. No. 3,594,823, entitled "Visual Substitution System With Receptor Scanning Means," issued July 27, 1971. Moreover, communication of tactile images to the skin by use of electrical impulses is also known. See, for example, U.S. Pat. No. 3,562,408, entitled "Hapticon Visual Substitution System," issued Feb. 9, 1971; U.S. Pat. No. 3,612,061, entitled "Flexible Cutaneous Electrode Matrix," issued Oct. 12, 1971; and U.S. Pat. No. 3,628,193, entitled "Tactile Image Projection System," issued Dec. 21, 1971.

Mechanical and electrical stimulation of the tactile nervous system at the skin for transmitting information to a person has heretofore presented the largest single obstacle in the efficient use of systems designed to supplement or replace a sensory modality such as required with lost sight.

First, this component at the tactile nervous system interface has heretofore constituted the most intricate and correspondingly expensive item in such systems. In the case of mechanical systems, the necessity of providing a matrix of a large number of individually vibrating devices, all in direct contact with the skin, has been extremely expensive, and heavy. Moreover, where electrical stimulation is used, not only has the system often proved uncomfortable, but the cost of producing an array of stimulus drivers and electrodes adapted to contact the wearer's skin with their required cable feed connectors and of electrical impulses has additionally been prohibitively expensive.

Moreover, the resolution of both mechanical and electrical systems has heretofore been equipment limited and not tactile nervous system limited. Thus, the resolution of the image transmitted to the skin has been less than the resolution of the image capable of being received by the tactile nervous system.

Finally, mechanical and electrical matrices for the stimulation of the tactile nervous system have heretofore had some difficulty in maintaining the required cutaneous contact. Uneven skin contact has caused uneven skin stimulation with consequent stinging electrical pain. Consequently, uniform stimulation of the cutaneous nervous system over the relatively large areas required for tactile image transmission has been difficult.

SUMMARY OF THE INVENTION

A tactile imaging interface to the human body is disclosed for operation in combination with an input transducer (typically a solid-state image sensor), and suitable conversion electronics. A fluid jet, preferably discharging water, is deflected by electro-mechanical motors (typcially a galvanometer) such as is used to drive pen motors and modulated in discharge pressure to impinge its resultant discharge jet on a thin flexible membrane in contact with a mechanically sensitive skin area. The conversion electronics drive the galvanometer motor controls for deflection and modulate the jet discharge in response to the input transducer which is typically an image sensor receiving an image. By the expedient of providing the transducer (or image sensor) and jet with either a conventional raster scan or a preferred cursive scan, or cursively tracing a stored, raster scanned image (by a cursive tracing algorithm in an analog or digital computer), or slowly tracing fast oscilloscope wave forms onto the skin by use of a conventional sampling amplifier, transduced information supplementing or replacing a sensory modality (typically lost vision) is transmitted to the human tactile nervous system through the membrane.

OTHER OBJECTS AND ADVANTAGES OF THE INVENTION

An object of this invention is to provide a simplified man-machine interface to serve as a skin stimulator for producing two-dimensional mechanical images on the skin. According to this aspect of the invention, a liquid jet is impinged upon a thin flexible membrane. The membrane, in turn, is in intimate contact with the skin. Impingement of the liquid provides the necessary cutaneous nervous stimulation to impart a tactile image to supplement or replace a sensory modality.

An advantage of this invention is that water has been found to have sufficient density to easily impart tactile sensory impression through a membrane to the human body. The surface tension of water also maintains a small diameter (cross section) stimulus at long distance.

An additional advantage of utilizing a water jet to impart tactile information to the body is that the jet functions as an inexpensive analog of a cathode ray tube; water replacing the electron beam. By the expedient of altering jet direction and intensity, image patterns can easily be projected or traced on the human body.

A further advantage of this invention is that the tactile image system is no longer equipment limited as to the detail or resolution that can be presented on the human body. The disclosed hydraulic jet is capable of continuously tracing a tactile image over the cutaneous nervous system to transmit the required image information in a trace that is limited in resolution by the nervous system receptors, and not limited by the disclosed stimulator. For example, image resolution on the stomach area of an individual heretofore equipment limited to a point-to-point spacing of six to eight (6–8) millimeters is no longer so limited.

Yet a further advantage of this invention is that uniform contact with the tactile nervous system over the entire area to which an image or information is being transmitted is relatively easy to maintain. The mechanical and electrical limitation of discrete stimulator arrays being spaced apart one from another is no longer applicable to the water jet system herein shown.

A further object of this invention is to disclose the skin stimulator interface in combination with an image sensor in a raster scanning mode for imparting images transduced by the image sensor to the tactile nervous system of a subject.

An advantage of this image sensor application of the skin stimulator is that random real world images can be displayed in a water jet matrix produced by raster scanning. The use of a plurality of discrete skin stimulators in contact with a large cutaneous surface is not required.

Yet another object of this invention is to disclose a preferred cursive tracing of images on a large skin area to provide improved image transmission. According to this aspect, the water jet can be driven by known cursive tracing programs following typically the outline of letter or numeral characters to provide a mechanico-image on the human skin.

An advantage of cursively tracing images on the skin is that greater tactile perception inherently results. Training in tactile image recognition can be minimized and perception of the tactile image optimized through the cursive technique disclosed herein.

A further advantage of this invention is that the prosthetic possibilities of communication through the skin include not only sight, but also sound, touch, the kinesthetic sense of limb position and olfaction, and also the augmentation of existing, functioning senses. The latter possibility includes proviidng some of the necessary instrument or contact information for flying an airplane to an otherwise overloaded pilot; or supplying patterned directional information to divers for underwater applications; radar or sonar displays; permitting communication in a noisy environment; transmitting tactical orders on a battlefield at night; or wherever necessary, the transmission of silent instructions.

Other objects, features and advantages of this invention will become more apparent after referring to the following drawings in which:

FIG. 1 is a schematic view of the tactile image stimulator of this invention operatively connected to a scanning vidicon tube and impinging the force of a fluid jet onto the skin through a thin membrane;

FIG. 2 is a detail in section of the jet illustrating one embodiment of its construction;

FIG. 3 is an embodiment of an apparatus for modulating the discharge of the jet onto the elastic membrane; and, FIG. 4 is an alternate embodiment of equipment for the high frequency video modulation of the discharge onto the body.

Referring to FIG. 1, a preferred embodiment of this invention is illustrated. A tactile television system adapted to provide images from the visible world to the blind and other individuals is provided. The tactile image traced on the human body is an analog of visible objects detected by a television camera and optical system. Typically, a small television camera and optical system can be mounted to the head of a person (to an eye glass frame, for example) or to specific instrumentation being used (such as a microscope, oscilloscope, digital display, etc.).

Video signals of an object O are produced by appropriate scanning of a television camera, here shown as solid-state photosensor camera C. These signals are transduced by electronic circuitry E which serves to guide and modulate water jet J through motor controls M in a synchronous sweep with the vidicon. Water discharged from fluid jet J impinges upon flexible membrane F to impart tactile images to the skin. The image formed on the cutaneous nervous receptors is detected at the receptor level and is then conducted via peripheral nerves to the subject's central nervous system, where an image is perceived and a concept of the visible object is formed.

In FIG. 1, visible object O is imaged by an appropriate lens system 11 which may include a microscope, a telescope, a wide-angle or "fish eye" lens and appropriate zoom optics. Electronic zoom can also be effected by varying the size or area of the scanning pattern on the image sensor. The image produced by the lens system 11 is impressed upon a photo-sensitive surface 12 of the image sensor 13. Image sensor 13, as is conventional, includes deflection circuitry 14 sampling a small area which is caused to scan across a photosensitive camera surface 12 by means of appropriate deflection signals applied at 16. Such scanning of sampling area produces a video signal at output 17 of the image sensor.

The video signal output from camera 13 is amplified by a suitable video amplifier 18. This output is applied to modulate the pressure to the jet J and thus the intensity of the fluid jet which impacts the flexible membrane F on the skin of the wearer.

The output of video amplifier 18 can be communicated to a display processor 19. Display processor 19 may consist of a logarithmic brightness circuit whose transfer function is adjusted to fit the approximately logarithmic skin stimulus-response of the individual user. Such an apparatus is described in the Proceedings of the San Diego Biomedical Symposium, 1974, Volume 13, in the article entitled *TACTILE SENSORY REPLACEMENT* by applicant and Julius M. J. Madey. By this means, the dynamic range of the entire system can be extended by an order of magnitude.

Deflection of the jet J is produced by common sweep and deflection circuitry 14, in synchronous sweep and deflection with image sensor camera 13. Sweep and deflection circuitry 14 through motor controls M causes raster scanning of the jet across the flexible membrane F. A mechanical reproduction of the image of the visible object O is produced at the flexible membrane F by the modulated and deflected fluid jet J. This is perceived as a tactile image on the skin of the subject using the device.

The action of the fluid jet J can best be understood by first detailing the fluid circuit. Thereafter, a more detailed discussion of the deflection and intensity modulation can be made.

Typically, pump 25 draws fluid 26 from a reservoir 27. Fluid 26 preferably comprises water of fluid containing a surface active agent to modify surface tension to enable the fluid jet J to be self coherent and have a minimum tendency to expand or break up before impact upon flexible membrane F. This produces the smallest stimulus spot size and maximum resolution.

Pump 25 typically provides an output in the range of 10 to 30 pounds per square inch. The input is passed through a fluid modulator valve 30 and thereafter to a flexible coupling 32, and finally to a fluid nozzle 34. When the fluid jet impinges upon the membrane, the fluid runs down the membrane and is returned to the fluid reservoir 27.

Nozzle 34 typically has an inside diameter of about one (1) millimeter. It is preferably spaced from the elastic membrane at a distance of between approximately five (5) or ten (10) inches. Force of impact at flexible diaphragm F ranges from 9.4 grams at 30 psi, to 2.9 grams at 10 psi. Pressures to 30 psi on a fluid jet have been successfully employed in practice. Velocity of impact on the membrane can range from about 35 feet per second at 10 psi to about 65 feet per second at 30 psi.

Flexible membrane F is in direct contact with the skin 35 of a subject using this apparatus. The scalp or forehead has been found preferable, having a tactile resolution of about twice that on the abdomen, a secondarily preferred tactile imaging area. Flexible membrane F is a standard item of manufacture. For example, Young's Dental Dam, pure latex, manufactured by the Young's Dental Manufacturing Company of Maryland Heights, Missouri can be and has been used successfully for this function.

Orthogonal deflection of the jet has been provided by two pen motors 38, 39 which are in turn connected to the common sweep and deflection circuitry. Pen motors suitable for such operation are Galvanometer Pen Motors, manufactured by Mechanics for Electronics, Inc. of Wilmington, Massachusetts and sold under Model No. R4-077. Such pen motors are capable of responses in the range of 100 Hz thus scanning a 10 × 10 raster matrix at about ten (10) times per second or a 32 × 32 raster matrix at a rate of approximately three (3) times per second on the flexible membrane F.

Referring to FIG. 2, the construction of a typical jet J for use with this invention is illustrated. A spherical concavity 39 is defined interiorly of a housing 40. A sphere 42 is lodged within housing 40 and has a size so that freedom of movement of the sphere with respect to the housing 40 easily occurs.

Sphere 42 is transpierced by a discharge jet 45. Discharge jet 45 communicates to a fluid conduit 47 at one end, passes through sphere 42 at the middle, and discharges at end 48 towards a flexible membrane F.

The pen motor drive of such a discharge jet can be easily understood. Pen motors of the type previously described have a rotational ouput. This output is used on a short lever arm to cause translation of piano wire connected at the lever arm end. Thus, a vertical piano wire 46 coupled to the discharge nozzle 45 produces y-axis deflection; a horizontal piano wire 49 coupled to the discharge nozzle 45 produces x-axis deflection. Such mechanical connections can be provided by looping the wire around a small sphere connected to the discharge jet to provide the desired response. It is preferred to have the nozzle controlled in deflection from one side of the housing 40 and have jet J emanate from the opposite side of the housing. Thus the motors can be isolated from the moisture of water spray in the jet chamber.

It remains to understand fully the modulation of the discharge jet which typically impinges water at full velocity for the bright portion of an image, and either ceases discharge or operates discharge at a reduced rate for dark portions of an image.

Typically, valve 30 can constitute a conventional electro-mechanical valve. It has been found, however, that conventional electro-mechanical valves, through their changes in fluid momentum, result in reduced responses and undesirable side effects such as water hammer and the like. Modulation of the fluid jet with more sophistication is therefore preferred, as illustrated more particularly in FIGS. 3 and 4.

Referring to FIG. 3, a conduit 50 supplies fluid at pump pressure from pump 25 (see FIG. 1) to a cylindrical valve housing 52. Valve housing 52 has mounted interiorly thereof a cylindrical valve plug 54 transpierced by a bore 56. Bore 56 communicates to a valve discharge junction 60.

Valve discharge junction 60 provides two conduits. A first conduit 62 returns to sump 27. Second conduit 64 goes directly to jet J.

A conventional pen motor 68 of the type described is linked by shaft 69 to plug 54. Pen motor 68 drives plug 54 to align bore 56 to discharge either to passageway 64, or to passageway 62. Thus a proportionally modulated stream emanates from the jet nozzle to produce a half-tone image.

Realizing this, the operation of the apparatus of FIG. 3 is easily understood. When video amplifier 18 has an output emulating a light image point, high speed electro-mechanical (video modulating) motor 68 (galvanometer) (typically high torque-to-inertia) aligns bore 56 so that the resultant jet of water passes to conduit 64 and thence to the jet J. Alternately, when a very dark portion of an image is encountered, bore 56 is aligned (as shown in broken lines) to discharge water to conduit 62 and direct to sump 27 where the impingement of the jet on the flexible membrane F will not occur.

Referring to FIG. 4, an alternate means of producing a modulated outflow from jet A is illustrated. A cylindrical piezoelectric transducer device such as that manufactured by the Clevite-Brush Electronics Company of Bedford, Ohio may be used. As is conventional in such piezo-electric transducers, connection to appropriate positive and negative electric circuitry at 70, 72 is made.

Upon receiving a change in charge, the piezo-electric transducer undergoes a small but predictable change in dimension. As is known, such changes in dimension can exceed 1 kilo Hertz in frequency.

The upper portion of the piezo-electric transducer is connected to a conventional exponential tapered member acoustical transformer. Such acoustical transformers are formed of a tapered piece of metal formed on the outlines shown in FIG. 4. These devices are well known in the prior art.

As is known, the acoustical transformer increases the effective excursion of motion of the piezo-electric transducer. In the acoustical transformer here shown, the displacement or motion can be increased by at least an order of magnitude.

The acoustical transformer communicates to a small chamber 75 having a flexible diaphragm wall 76. This diaphragm modulated pressure chamber receives a constant inflow from pump 25 (see FIG. 1) and communicates outflow at 77 to jet J.

Operation of the jet is easily understood. Specifically, when a dark image is detected, and a minimum flow of fluid is required, diaphragm 75 is retracted by the piezo-electric transducer through the acoustical transformer to reduce the pressure and flow at conduit 77 to jet J. Conversely, when a bright portion of an image is detected, the piezo-electric transducer increases the force and pressure on the diaphragm 75 through expansion of the acoustical transducer to produce an increased pressure and flow to jet J through aperture 77.

It should be understood that the term "television camera" as herein used includes any type of device which can determine the local intensity at all locations of an image. Moreover, whereas a solid-state image sensor or vidicon tube has been shown as now preferred, the generic use of a television camera is included as a generic portion of the disclosure.

Moreover, it should be apparent that scanning of the fluid jet can be responsive to a number of inputs. For example, stored letter images in computer memory can be tapped to trade out cursive images upon call. Likewise, cursive tracing utilizing the technique set forth in the article entitled *Optical Character Recognition* by M. David Freedman, published in the IEEE Spectrum of March, 1974 can be used. Specifically, and with attention to this latter reference, the technique described on page 47 thereof at FIG. 6, and the text relating thereto can be useful for cursively tracing images with the fluid mechanical tactile oscilloscope here disclosed. Additionally, deflection of the jet has here been preferably disclosed using electro-mechanical motors. Other deflection systems, such as magnetic fluid or electrostatic deflection systems, air deflection systems and the like, could as well be used.

I claim:

1. In the combination of apparatus for supplementing or replacing the sensory modalities of a person including an input transducer for receiving the information modulated physical energy appropriate to the modality to be supplemented, a tactile imaging interface for the human body for imparting said transduced sensory information to a person, and means for driving said tactile image interface responsive to said transduced sensory information, the improvement to said tactile imaging interface comprising: a fluid jet capable of deflection; means for supplying pressure modulated fluid to said discharge jet; means for deflecting said jet responsive to said means for driving; and, a flexible membrane for contacting the skin of said person on one side and having the impingement of said jet on the other side to permit the impact of said jet to transmit through said flexible membrane, a tactile stimulation to the skin of said person.

2. The combination of claim 1 and wherein said means for supplying fluid to said jet supplies water to said jet.

3. The combination of claim 2 and wherein said means for supplying fluid to said jet includes means for supplying a liquid to said jet, a sump communicated to said membrane for receiving fluid after impingement upon said membrane, and a pump having an intake at said sump and a discharge to said jet.

4. The combination of claim 1 and wherein said fluid jet is capable of orthogonal, two-dimensional deflection and said driving means orthogonally deflects said jet responsive to said transduced sensory mode.

5. A mechanical-cutaneous interface apparatus for transmitting to a human patterned tactile stimulation to supplement or replace a natural sensory modality comprising: a fluid jet; means for supplying a flow of fluid to said jet; means for deflecting said fluid jet responsive to image generated sweep and deflection electrical impulses; means for receiving sweep and deflection electrical impulses attached to said apparatus and communicated to said deflection means; and, a flexible membrane for contact with the skin of a person on one side, and disposed for impact of said jet on the opposite side to transmit through said flexible membrane patterned, dimensional spatio-temporal tactile stimulation of peripheral receptors to the central nervous system of said human.

6. The invention of claim 5 and said means for supplying said fluid jet includes means for modulating the intensity or pressure of said fluid jet responsive to an image intensity electrical impulse.

7. The invention of claim 6 and wherein said means for intensity modulation of said fluid jet includes a linear or proportional valve having a first discharge to said jet and a second discharge away from said jet.

8. The invention of claim 6 and including means for continuous tone modulation of said fluid jet, including a fluid chamber with communicating diaphragm driven by a linear, high-frequency, response motor to pressure modulate the jet issuing therefrom.

9. The invention of claim 6 and wherein said means for modulating said fluid jet includes a flexible diaphragm for receiving the flow of fluid to said jet and means for expanding and contracting said diaphragm to reduce and accelerate respectively the flow of fluid to said jet.

10. The invention of claim 5 and wherein said means for supplying fluid to said jet includes means for supplying water and surface active agent to said jet.

11. The invention of claim 5 wherein said means for deflecting said fluid jet includes a cursive tracing algorithm which permits pictorial information from a television camera to be traced as a continuous outline onto the skin of said human.

12. In combination a television camera; a fluid jet; means for supplying a video modulated flow of fluid to said jet; means for deflecting said jet over the surface of a membrane for contact with the skin of a person on one side, and adapted for impingement of said jet on the other side to impart to the skin of said person a tactile image; means for sweeping operatively connected to said television camera and said means for deflecting said jet for producing the corresponding sweep of said television camera and said jet; means for detecting local image intensity, point for point, at said television camera operably connected to said means for supplying a correspondingly modulated flow of fluid to said jet to provide said jet with a flow of fluid responsive to and reproducing, point for point, said image intensity on the skin of a human at the output interface.

13. The invention of claim 12 and wherein said means for sweeping is adapted to provide a raster scan.

14. The invention of claim 12 and wherein said means for sweeping is adapted to provide a cursive scan of the outlines of an image.

15. The invention of claim 12 and wherein said television camera is a vidicon.

16. The invention of claim 12 and wherein said television camera is a solid-state photo-electric image sensor.

* * * * *